United States Patent
Kodali et al.

(10) Patent No.: US 8,099,110 B2
(45) Date of Patent: Jan. 17, 2012

(54) APPARATUS AND METHOD FOR EFFICIENT DETERMINATION OF MOBILE STATION LOCATION IN A WIRELESS NETWORK

(75) Inventors: Sanjay Kumar Kodali, Dallas, TX (US); Jeyakesavan Veerasamy, Richardson, TX (US); Nivedan Thadasina, Allen, TX (US); John C. Jubin, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 780 days.

(21) Appl. No.: 11/150,921

(22) Filed: Jun. 13, 2005

(65) Prior Publication Data

US 2006/0025160 A1 Feb. 2, 2006

Related U.S. Application Data

(60) Provisional application No. 60/592,074, filed on Jul. 29, 2004.

(51) Int. Cl.
*H04W 24/00* (2009.01)

(52) U.S. Cl. ............... 455/456.5; 455/456.1; 455/456.3; 455/441; 455/436; 455/435.1; 455/435.2; 455/435.3; 455/445

(58) Field of Classification Search ............... 455/456.1, 455/456.2, 456.3, 456.5, 517, 426.1, 441, 455/436, 435.1, 435.2, 435.3, 445
See application file for complete search history.

(56) References Cited

U.S. PATENT DOCUMENTS

| | | | |
|---|---|---|---|
| 5,666,655 A * | 9/1997 | Ishikawa et al. | 455/512 |
| 2002/0013153 A1* | 1/2002 | Wilcock et al. | 455/456 |
| 2002/0068580 A1* | 6/2002 | Bala et al. | 455/456 |
| 2003/0148771 A1* | 8/2003 | de Verteuil | 455/456 |
| 2004/0017310 A1* | 1/2004 | Vargas-Hurlston et al. | 342/357.1 |
| 2004/0198395 A1* | 10/2004 | Kimoto et al. | 455/456.1 |
| 2004/0219932 A1* | 11/2004 | Verteuil | 455/456.2 |
| 2005/0186971 A1* | 8/2005 | Ray et al. | 455/456.5 |
| 2008/0013492 A1* | 1/2008 | Lee et al. | 370/331 |

* cited by examiner

*Primary Examiner* — Ajit Patel
*Assistant Examiner* — Khai M Nguyen (57) ABSTRACT

An apparatus and method for efficient determination of mobile station location in a wireless network. A location register database is used by base station controllers to track the locations of mobile stations.

20 Claims, 4 Drawing Sheets

APPARATUS AND METHOD FOR EFFICIENT DETERMINATION OF MOBILE STATION LOCATION IN A WIRELESS NETWORK

CROSS-REFERENCE TO RELATED APPLICATION AND CLAIM OF PRIORITY

The present invention is related to that disclosed in U.S. Provisional Patent No. 60/592,074, filed Jul. 29, 2004, entitled "Efficient Location Management for Fast Call Setup". U.S. Provisional Patent No. 60/592,074 is assigned to the assignee of the present application. The subject matter disclosed in U.S. Provisional Patent No. 60/592,074 is hereby incorporated by reference into the present disclosure as if fully set forth herein. The present application hereby claims priority under 35 U.S.C. §119(e) to U.S. Provisional Patent No. 60/592,074.

TECHNICAL FIELD OF THE INVENTION

The present invention relates generally to wireless networks and, more specifically, to a system for tracking the location of a mobile station in a wireless network.

BACKGROUND OF THE INVENTION

Fast call setup has been one of the key areas of interest for wireless services. Due to the mobility of the user, the network needs to determine the exact location of the mobile prior to establishing a mobile-terminated call.

Traditionally, the network uses paging to determine the exact location of the mobile and this takes anywhere between 500 ms to a few seconds. This delay is, at best, a factor in user satisfaction, and at worst, can result in missed calls.

Therefore, there is a need in the art for an improved apparatus and method for efficient determination of mobile station location in a wireless network.

SUMMARY OF THE INVENTION

To address the above-discussed deficiencies of the prior art, it is a primary object of the present invention to provide, for use in a wireless network, a base station capable of communicating with a plurality of mobile stations, said base station comprising a base station controller; and a location database configured to communicate with the base station controller and to store location data corresponding to the plurality of mobile stations.

It is another object of the present invention to provide method for operating a wireless network, comprising providing a plurality of base stations capable of communicating with a plurality of mobile stations, each base station having a base station controller; and maintaining a location database configured to communicate with the base station controller and to store location data corresponding to the plurality of mobile stations.

It is another object of the present invention to provide, for use in a wireless network, a base station capable of communicating with a plurality of mobile stations, said base station comprising a base station controller; a receiver for receiving location updates from the plurality of mobile stations, configured to communicate with the base station controller; and a location database configured to communicate with the base station controller and to store location data corresponding to the location updates, wherein the base station can predict a next cell location for at least one of the plurality of mobile stations based on location updates received from that mobile station.

Other objects and features will be apparent from the description and drawings.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles, of the present invention may be implemented in any suitably arranged wireless network.

The disclosed embodiments include multiple location management techniques, which allow the network to keep track of mobile location at the least possible granularity, almost at the level of a subcell. This allows the network to do a direct call setup without paging the mobile, thus reducing the call setup time. All this is accomplished without increasing the effective signaling overhead and hence location management costs. These techniques also predict the probability of success and associated resource costs of a direct call establishment, allowing flexibility in using either the new direct call establishment method or the traditional paging method.

The specific embodiments discussed herein are described in terms of a CDMA200 network architecture, but those of skill in the art will recognize that the same concepts can be used in any personal communication systems, e.g., TDMA, GSM, WCDMA, and other systems.

Figure 1:
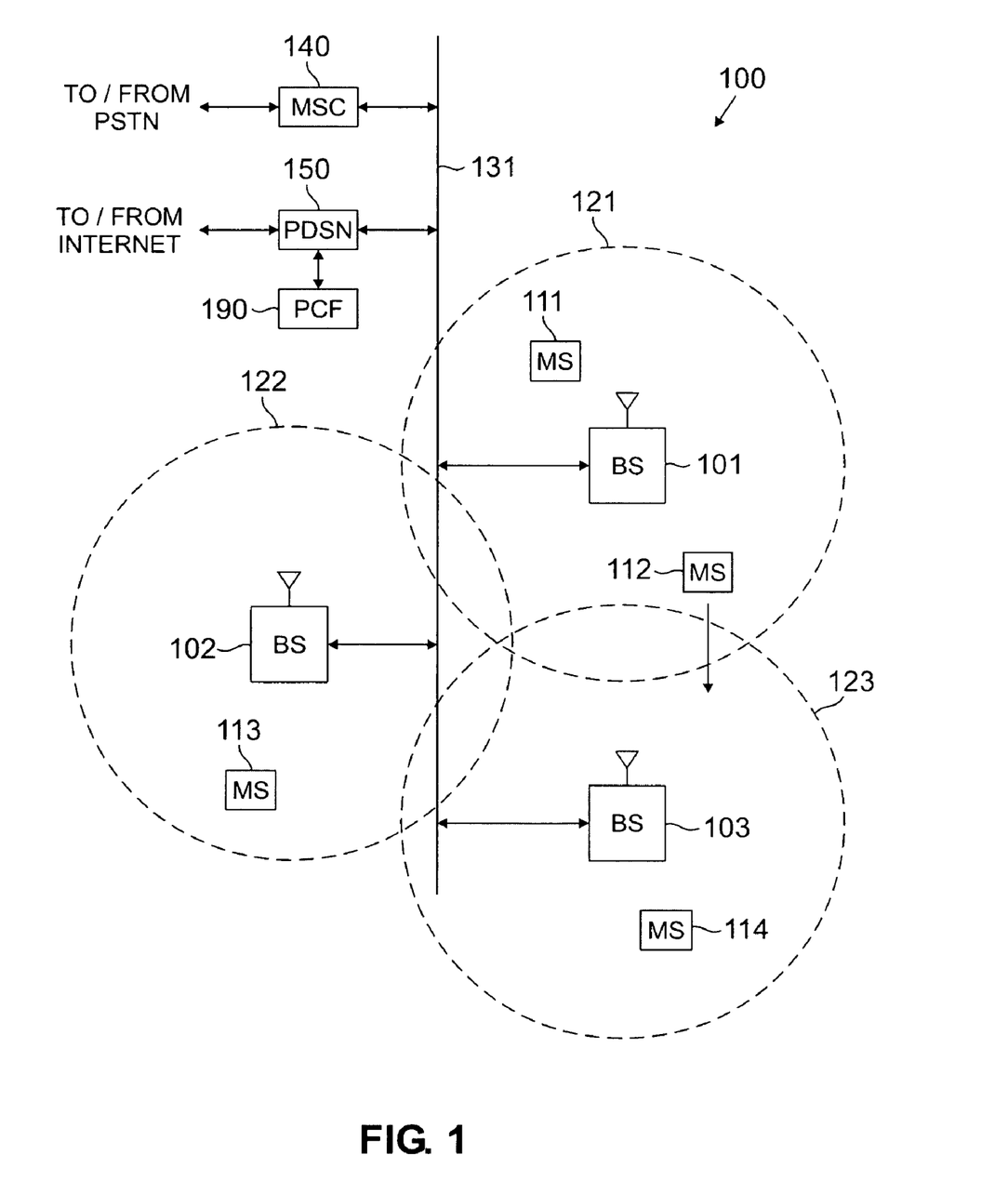
FIG. 1 illustrates an exemplary wireless network that tracks the locations of mobile stations according to the principles of the present invention.

FIG. 1 illustrates an exemplary wireless network 100, which tracks the locations of mobile stations according to the principles of the present invention. Wireless network 100 comprises a plurality of cell sites 121-123, each containing one of the base stations, BS 101, BS 102, or BS 103. Base stations 101-103 communicate with a plurality of mobile stations (MS) 111-114 over code division multiple access (CDMA) channels according to, for example, the IS-2000 standard (i.e., CDMA2000). In an advantageous embodiment of the present invention, mobile stations 111-114 are capable of receiving data traffic and/or voice traffic on two or more CDMA channels simultaneously. Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

The present invention is not limited to mobile devices. The present invention also encompasses other types of wireless access terminals, including fixed wireless terminals. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability).

Dotted lines show the approximate boundaries of cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, each of cell sites 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present invention is not limited to any particular cell site configuration.

In one embodiment of the present invention, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Line 131 also provides the connection path for control signals transmitted between MSC 140 and BS 101, BS 102 and BS 103 that establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. The connections on line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

As used herein, the term "core network" (CN) will be generally understood to include MDSN 150 and MSC 140, and related elements on the service provider level. The "radio access network" (RAN) will be generally understood to include PCF 190 and BS 102, and related elements on the RF network level.

Figure 2:
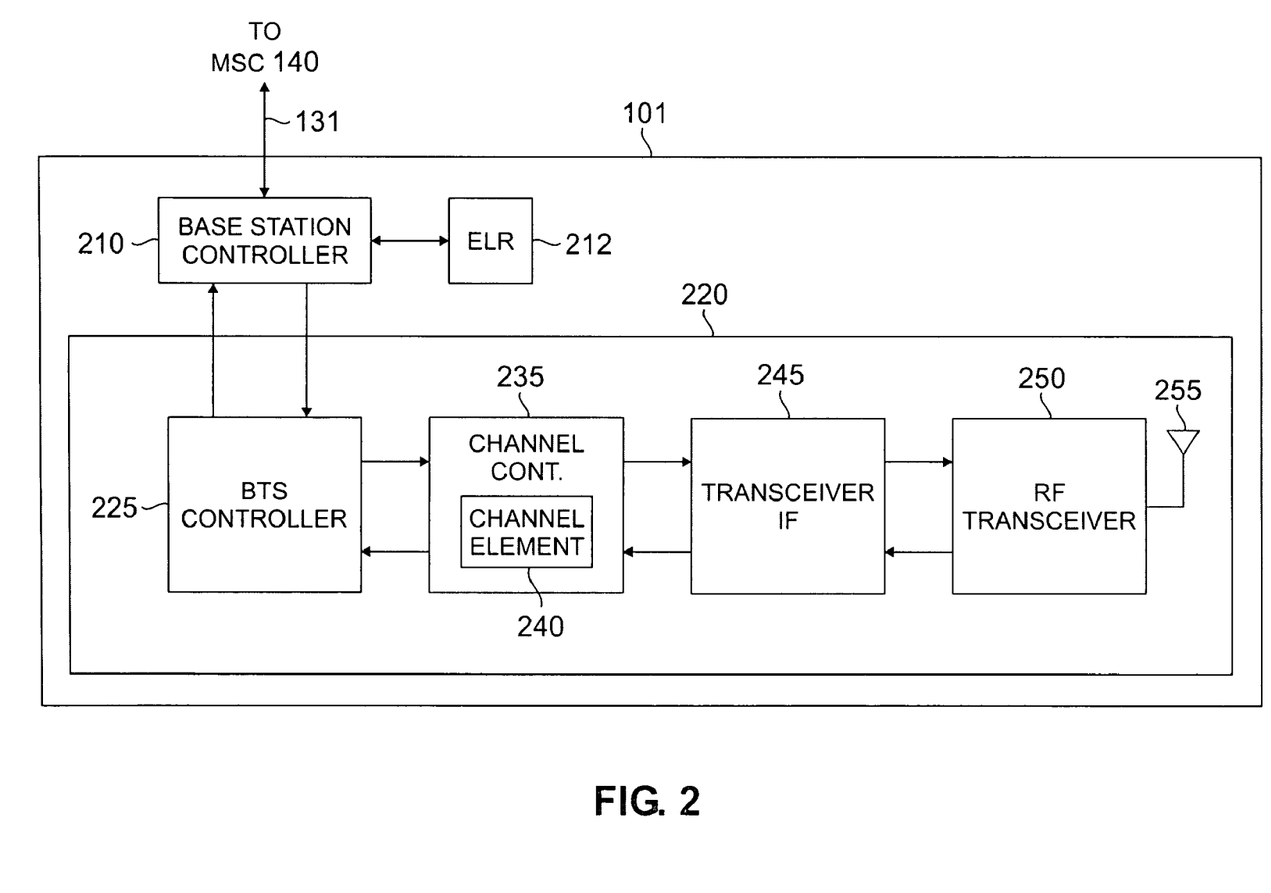
FIG. 2 illustrates exemplary base station 101 in greater detail according to an exemplary embodiment of the present invention.

FIG. 2 illustrates exemplary base station 101 in greater detail according to an exemplary embodiment of the present invention. Base station 101 comprises base station controller (BSC) 210 and base transceiver station (BTS) 220. Base station controllers and base transceiver stations were described previously in connection with FIG. 1. BSC 210 manages the resources in cell site 121, including BTS 220. BSC 210 includes, in preferred embodiments, an exact location register (ELR) 212, described more fully below. BTS 120 comprises BTS controller 225, channel controller 235 (which contains representative channel element 240), transceiver interface (IF) 245, RF transceiver 250, and antenna array 255.

BTS controller 225 comprises processing circuitry and memory capable of executing an operating program that controls the overall operation of BTS 220 and communicates with BSC 210. Under normal conditions, BTS controller 225 directs the operation of channel controller 235, which contains a number of channel elements, including channel element 240, that perform bi-directional communications in the forward channel and the reverse channel. A "forward" channel refers to outbound signals from the base station to the mobile station and a "reverse" channel refers to inbound signals from the mobile station to the base station. Transceiver IF 245 transfers the bi-directional channel signals between channel controller 240 and RF transceiver 250.

Antenna array 255 transmits forward channel signals received from RF transceiver 250 to mobile stations in the coverage area of BS 101. Antenna array 255 also sends to RF transceiver 250 reverse channel signals received from mobile stations in the coverage area of BS 101. In a preferred embodiment of the present invention, antenna array 255 is multi-sector antenna, such as a three-sector antenna in which each antenna sector is responsible for transmitting and receiving in a 120° arc of coverage area. Additionally, RF transceiver 250 may contain an antenna selection unit to select among different antennas in antenna array 255 during both transmit and receive operations.

Location management is functionality of the core network. In case of conventional mobile tracking, a Radio Access Network (RAN) relays the messages between core network and mobile. Well-known conventional location management strategies are cell-based location management, zone-based location management, and distance-based location management.

In conventional cell-based location management, when a mobile station performs idle handoff, it sends location updates. In this method, signaling overhead for location updates is very high especially when mobiles are moving fast. Even though network can track mobiles at the granularity of subcell, signaling overhead is very high. Thus this strategy is not very commonly used in the deployed networks.

In conventional zone-based location update systems, the whole network area is divided into number of zones. The network tracks the mobile's location at the granularity of zone. Mobile sends location update only when it moves to a new zone. To find the exact location of the mobile, the network pages in all the subcells in the zone received in the last location update from that mobile. This type of known system reduces the location management costs since network is tracking the mobile at the granularity of zone. It is widely used in the deployed networks.

A conventional distance-based location update system allows every mobile to have a dynamic zone centered at cell where mobile has sent its last location update with radius 'r' (given by network). When the displacement of mobile from the center of the dynamic zone exceeds 'r' then it sends location update and creates a new dynamic zone centered at current subcell. The network needs to know the topology of the network to page mobile in all the subcells in the dynamic zone. Location management costs depend on the radius of the dynamic zone.

The disclosed techniques do not replace any of the conventional location management systems. Instead, they use the benefits of conventional methods and enhance the overall functionality to meet the above objects.

Location management is a function of the wireless network. According to preferred embodiment, location management functionality is distributed between the RAN and the core network. Core network functionality in the location management, tracking mobiles at the higher granularity (at a zone level) remains the same. RAN tracks mobiles in the least possible granularity.

In the network architecture, a database called an Exact Location Register (ELR) is used to keep track of all the mobiles in the coverage area of a base station controller (BSC) in a system as described below. Every BSC can maintain a separate ELR or a group of BSCs can together have a centralized ELR. ELR could also be an integral part of a BSC, but could also be remotely located from the specific BSC.

Network topology: The core network divides the whole network area into a number of zones. RAN divides each zone into a number of mini zones (MZ). These mini zones can be a subcell or a group of subcells, they could be the tracking zones defined in IS-2000 Release D, or they could be GPS-location-based cells. MZ is considered as one or more subcells in the description herein.

As described herein, ELR also predicts the mobile station path based on the speed of the mobile and received mini location updates. That is, in various embodiments, the RAN can predict the next cell in which the mobile station will probably move, based on the mobile station's speed and path, determined from the updated history. Upon receiving a location update from the mobile station, the RAN predicts the next cell to which the mobile station may move. RAN sends that predicted list to the mobile station to reduce the location updates.

Various embodiments include two kinds of prediction: one based on the cell list, where the RAN predicts the mobile station's future cell locations and sends the list of cells to the mobile station. Other predictions can be distance-based, where the RAN give the radius of the location centered at the current mobile-residing cells as the current area. When the mobile station is in that radius, it will not send location updates. The RAN predicts the proper radius based upon the same parameters, speed, and location-updates history.

To track mobiles at the least possible granularity, preferably most of the subcells are configured as a mini zone. Some of the subcells can be grouped into a single MZ based on the traffic pattern. One example would be the subcells covering a highway between two exits. When mobile receives Mini Zone Id (MZI) in the overhead messages from RAN (since we are using cell based mini zones), it initializes MZI_LST to the received MZI.

The location in the location management can also be used for handoffs, in various embodiments.

Figure 3:
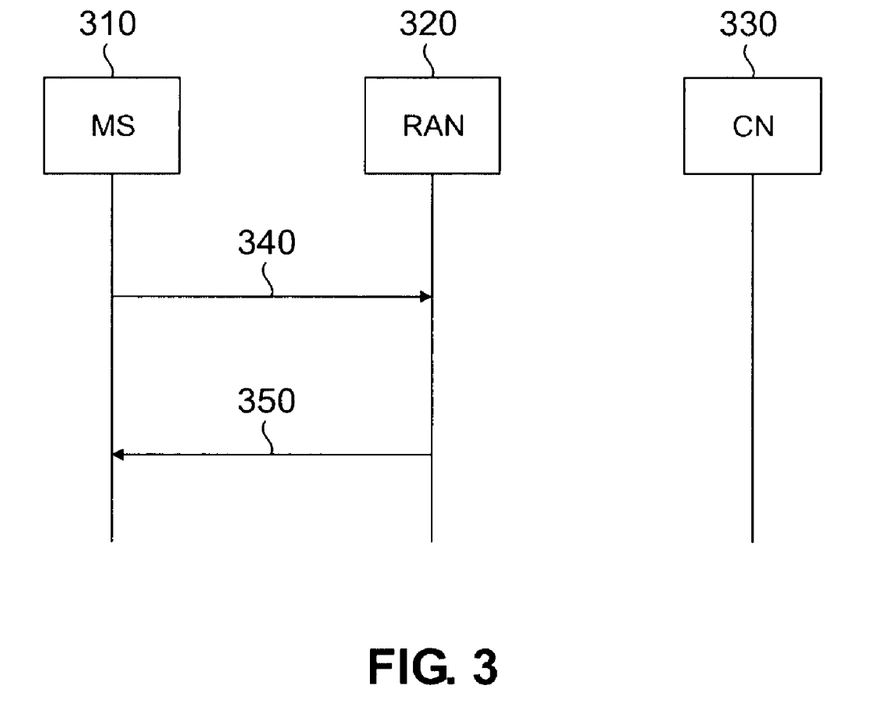
FIG. 3 illustrates mini location updates in accordance with an exemplary embodiment of the present invention.

FIG. 3 illustrates mini location updates in accordance with an exemplary embodiment of the present invention. When a mobile station 310 moves from one mini zone to another mini zone, the mobile station 310 performs mini location updates. As part of mini location update, it sends very short message 340 called mini registration message. Mini registration could be as small as an L2 header just to inform the mobile station identity. In this case, RAN 320 extracts the location of the mobile station 310 based on the subcell in which it received that message. Mobile station 319 can also send some important parameters to RAN like GPS location, average speed, and MZIs covering an overlapping area as part of mini registration message.

Mini registration messages 340 are received and processed by RAN 320. RAN preferably does not send any message to the core network 330, unlike in any conventional systems. Thus the processing cost of the core network is not impacted by mini location updates.

RAN 320 will send an acknowledgment message 350, preferably an L2 ACK, to mobile station 310.

Figure 4:
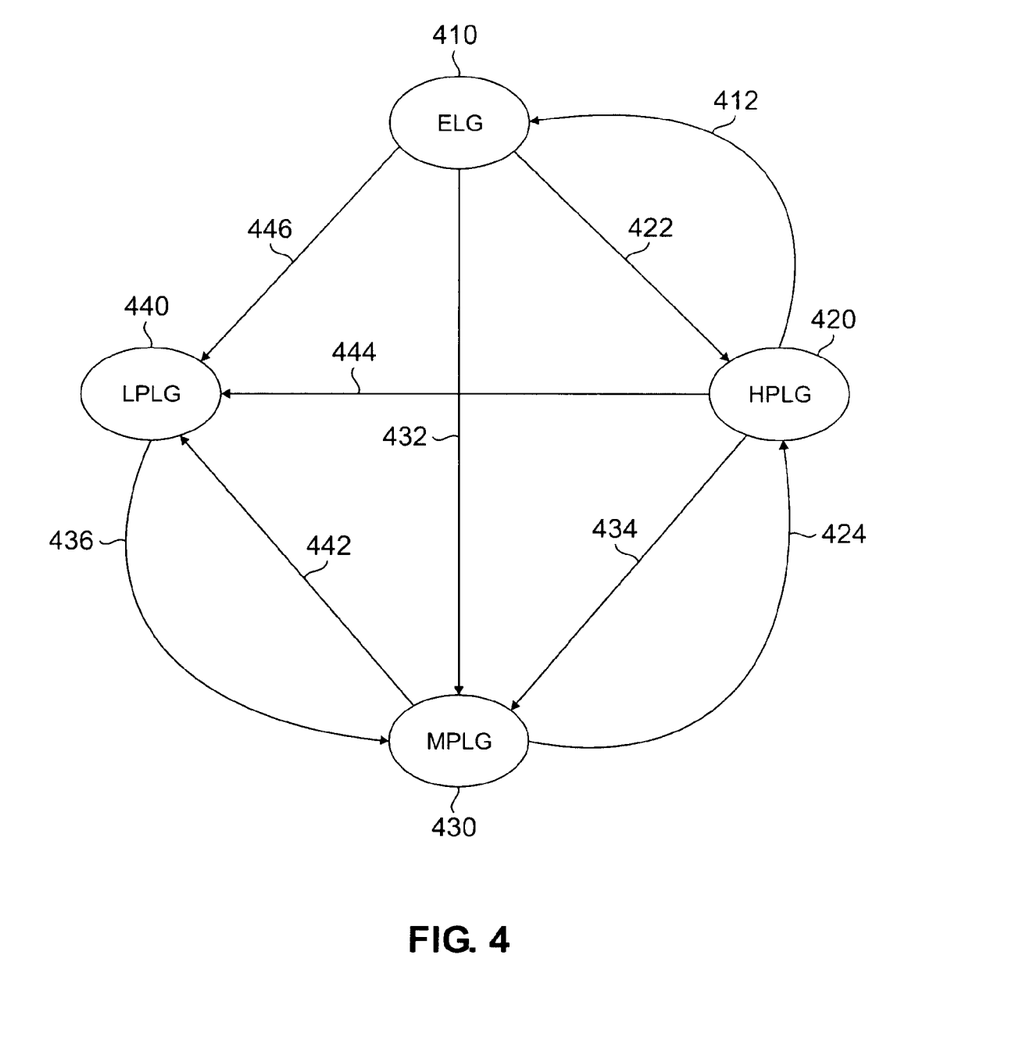
FIG. 4 illustrates various exemplary groups represented by the ELR, in accordance with various embodiments of the present invention.

Exact location Register: ELR is an efficient database, which keeps track of all the idle mobile stations in the coverage area of BSC(s) at the least possible granularity. ELR classifies all of the mobile stations into four different groups based on speed of the mobile station. FIG. 4 illustrates various exemplary groups represented by the ELR, which mobile stations are assigned to each, and how an MS is moved between them, in accordance with various embodiments of the present invention.

Exact Location Group (ELG) 410: Stationary mobile stations in the coverage of a mini zone.

High Probability Location Group (HPLG) 420: Mobile station in the overlap region (cover by 2 or mini zones) or very slow (pedestrian) moving mobile stations.

Medium Probability Location Group (MPLG) 430: Mobile stations moving the low or medium speeds.

Low Probability Location Group (LPLG) 440: Mobile stations moving with high speed.

Based on the speed of the mobile stations and number of location updates received, ELR keeps the mobile stations in the corresponding Group. A location group, in the preferred embodiment, refers to a class of mobile stations based on their current speeds. ELR maintains the current location of the mobile stations at the least possible granularity. The ELR preferably also maintains the probability of success of direct call establishment and associated resource cost of direct call establishment.

Various embodiments, described herein, use the same network topology and similar mini location updates.

Some embodiments include a predictive—efficient location management (P-ELM) technique. According to this technique, when a mobile station moves to a new mini zone, it sends a mini location update. If the newly entered mini zone is controlled by a new BSC, it adds an entry for that mobile record into ELR. Initially, all the mobile stations are placed in ELG. Based upon the speed of the mobile, mobile group is changed as shown in FIG. 4.

Every group maintains the following controllable parameters to move a mobile station to other groups:

$N_{lu}$: Number of mini location updates needed to receive in order to move a mobile station into any one of the lower probable group.

$T_{up}$: minimum amount of time to move a mobile station to high probable group.

$P_G$: Base probability of success of the group.

$S_G$: Maximum allowed speed of the mobile station in that group.

Stationary mobile stations would be in ELG 410. If a mobile station starts moving, then it sends mini location updates after performing an idle handoff. ELR stores the received mini location updates and the receiving time stamps. Based on the received mini location updates and its frequency, ELR determines the speed of the mobile station. Based upon the speed of the mobile station, ELR moves that mobile station into the corresponding group. If the MS is moving at a low speed, the MS is moved to HPLG 420, path 422. If the MS is moving at a medium speed, the MS is moved to MPLG 430, path 432. If the MS is moving at high speed, the MS is moved to LPLG, path 442.

If a mobile in HPLG 420 or MPLG 430 begins moving at a high speed, it is moved to LPLG 440, as shown as respective paths 444/446. If a mobile in HPLG 420 begins moving at a medium speed it is moved to MPLG 430 as shown as path 434.

ELR also predicts the mobile station path based on the speed of the mobile and received mini location updates. MZIs of mini zones covering the predicted path are sent to the mobile in a special message. The mobile station initializes the MZI_LST to the received list of MZIs.

If the mobile station performs idle handoff to any one of mini zone in the MZI_LST, it does not send mini location update. When the mobile station performs idle handoff to a mini zone whose MZI is not the MZI_LST then only it sends mini location update.

MZI_LIST size depends on the speed of the mobile station. When the mobile station is moving at higher speed then the size MZI_LIST becomes larger. Thus ELR reduces the signaling cost of mini location updates when mobile stations are moving.

However, the increasing the size of MZI_LIST increases the resource cost of direct channel assignment. Maximum size of MZI_LIST can be set to reduce resource cost of direct call establishment. Probability of success of direct call establishment depends on the maximum size of MZI_LST.

When ELR moves a mobile station into a group, it starts the timer for the duration of $T_{up}$. If ELR does not receive any mini location updates before timer expires, it moves the mobile station into the next higher probable group, via appropriate path 436/424/412, and sends the MZI_LST based on the previous history.

Apart from Mini location updates, ELR also uses other events/messages (e.g., timer-based registration to core network, call establishment/release, etc.) received by RAN from a mobile station to update the probability of success of direct call establishment to that mobile station.

If ELR does not receive any message from a mobile station for a long time, it reduces the probability of successful direct call establishment. If RAN receives power down registration then it deletes corresponding mobile station from the ELR. If ELR does not receive any mini location updates or any messages for long duration, then also it deletes that mobile station from ELR.

Exemplary pseudo-code for basic algorithms that can be used in P-ELM embodiments, unessential for understanding the claimed inventions, is included in the provisional patent application previously incorporated herein.

Other embodiments utilize distance-based efficient location management (D-ELM). As described above, P-ELM is and ELR driven technique based on efficient predictive algorithms. In D-ELM scheme, the mobile station assists RAN to efficient location management to simplify ELR functionality.

According to D-ELM embodiments, ELR maintains the same group and moves the mobile stations between the groups shown in FIG. 4. It also maintains many of the controllable parameters described above. It maintains one additional controllable parameter, $D_G$, the displacement to travel without sending mini location updates when mobile station is in that group.

RAN adds and deletes record of a mobile station in ELR as described above.

Stationary mobile station would be in ELG. If a mobile station starts moving then it sends mini location updates when it performs idle handoffs. ELR stores the received mini location updates and the receiving time stamps. The mobile station can send its average speed as part of the mini registration messages.

Based on the received mini location updates and its frequency, ELR can also determine the speed of the mobile station. Based upon the speed of the mobile station, ELR moves that mobile station into the corresponding group. RAN sends $D_G$ to the mobile station. Upon reception, the mobile station does not send mini location updates as long as the displacement of the mobile station from the last mini location update position is less than Dg. This minimizes the location update overhead. Thus D-ELM reduces the signaling cost of mini location updates when mobiles are moving fast.

When ELR moves a mobile station into a particular group, it starts a timer for duration of $T_{up}$. If ELR does not receive any mini location updates before the timer expiry, it moves the mobile station into high probable group and sends the corresponding Dg to the mobile station. If the mobile station reports its average speed very low, then that mobile station will be moved to the corresponding group directly.

The basic algorithm of D-ELM is very similar to the algorithm described above, and as illustrated in the exemplary pseudo-code presented in the incorporated provisional application.

Fast call setup: When the core network is requested to setup a mobile terminated call, RAN does direct call establishment in the current location of the mobile station according to the ELR. Based on the probability of success of direct call establishment and associated resource cost, RAN may choose to setup the call in tradition way to reduce the average call setup time and maximize the resource utilization.

Usage of D-ELM and P-ELM: The techniques described above give better results in different kind of traffic patterns. In a sub-urban area or highway, P-ELM give better results due to large size cells and because ELR can predict the path efficiently. In dense areas like downtown, D-ELM gives better results since it avoid the sending big predicted MZI_LST to mobile.

As described above, mini location updates are processed at RAN. Mini Registration messages are very small messages compared to registration messages. It also eliminates the cost of paging. So the effective signaling cost on the air-interface would be low. Since RAN is capable of tracking mobile at a very low granularity, core network can increase the size of the zone. This reduces the processing load of core network and the location updates cost.

The disclosed embodiments therefore track mobile stations at the least possible granularity and at the same time they reduce the effective signaling cost in air interface and processing load of the core network. These techniques also compute the probability of success of direct call establishment and associated resource cost, RAN can choose to establish the in traditional way to reduce the average call setup time.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a wireless network, a base station capable of communicating with a plurality of mobile stations, said base station comprising:
   a base station controller; and
   a location database configured to communicate with the base station controller and to store location data corresponding to the plurality of mobile stations,
   wherein the location database is configured to determine a probability of successful direct call establishment with a mobile station, wherein the probability of successful direct call establishment is dependent upon a probability of the location of the mobile station being known and wherein the probability of the location of the mobile station being known is based on a speed of the mobile station, and assign a location group to the mobile station based on the probability of the location of the mobile station, the location group having a plurality of parameters, the plurality of parameters including a minimum amount of elapsed time before the mobile station is assigned to a new location group.

2. The base station of claim 1, wherein the location data is used in call setup for a mobile station.

3. The base station of claim 1, wherein the location database assigns a location group to one of the plurality of mobile stations according to a determined probability of successful direct call establishment with the mobile station.

4. The base station of claim 1, wherein the mobile station is assigned a location group according to a speed that the mobile station is moving.

5. The base station of claim 1, wherein the base station controller receives a location update from one of the plurality of mobile stations, wherein the location update is not sent to a core network system.

6. The base station of claim 1, wherein the base station is one of a plurality of base stations, each base station comprising a base station controller, and the location database communicates with more than one of the plurality of base station controllers.

7. The base station of claim 1, wherein the base station is configured to receive at least one update from the mobile station in response to a change in the speed of the mobile station and update the probability of the location of the mobile station being known based upon the speed of the mobile station.

8. The base station of claim 1, wherein the location database assigns a location group to one of the plurality of mobile stations, the location group corresponding to a degree of location accuracy.

9. The base station of claim 1, wherein said base station receives a location update from a mobile station when the mobile station performs an idle handoff.

10. The base station of claim 1, wherein the base station controller selectively establishes a call with one of the plurality of mobile stations according to a probable accuracy of the location data corresponding to the mobile station.

11. A method for operating a wireless network, comprising
   providing a base station capable of communicating with a plurality of mobile stations, the base station including a base station controller; and
   maintaining a location database configured to:
      communicate with one of the plurality of base station controllers,
      store location data corresponding to the plurality of mobile stations,
      determine a probability of successful direct call establishment with a mobile station, wherein the probability of successful direct call establishment is dependent upon a probability of the location of the mobile station being known and wherein the probability of the location of the mobile station being known is based upon a speed of the mobile station, and
      assign a location group to the mobile station based on the probability of the location of the mobile station, the location group having a plurality of parameters, the plurality of parameters including a minimum amount of elapsed time before the mobile station is assigned to a new location group.

12. The method of claim 11, wherein the location data is used in call setup for a mobile station.

13. The method of claim 11, further comprising
   determining a probability of successful direct call establishment with one of the plurality of mobile stations; and
   assigning a location group in the location data base to the mobile station according to the determined probability of successful direct call establishment.

14. The method of claim 11, further comprising assigning a location group to a mobile station according to a speed that the mobile station is moving.

15. The method of claim 11, further comprising receiving a location update from a mobile station in the base station controller, wherein the location update is not sent to a core network system.

16. The method of claim 11, wherein the location database communicates with more than one of the plurality of base station controllers.

17. The method of claim 11, wherein the base station is configured to receive at least one update from the mobile station in response to a change in the speed of the mobile station and update the probability of the location of the mobile station being known based upon the speed of the mobile station.

18. The method of claim 11, wherein the location database receives a location update from the mobile station when the mobile station performs an idle handoff.

19. The method of claim 11, wherein the location database transmits a predicted next cell location to the mobile station.

20. The method of claim 11, wherein the location database comprises a speed information element regarding the mobile station.

* * * * *